United States Patent [19]
Lanus et al.

[11] Patent Number: 6,112,271
[45] Date of Patent: Aug. 29, 2000

[54] MULTICONFIGURATION BACKPLANE

[75] Inventors: Mark Lanus, Tempe; Anil Gupta, Phoenix; James Langdal, Scottsdale, all of Ariz.

[73] Assignee: Motorola, Inc., Schaumburg, Ill.

[21] Appl. No.: 09/079,040

[22] Filed: May 14, 1998

[51] Int. Cl.[7] .................................................. G06F 13/00
[52] U.S. Cl. ........................................... 710/128; 710/102
[58] Field of Search .................................. 710/102, 103, 710/126, 128, 129, 104, 8, 10; 713/1, 100

[56] References Cited

U.S. PATENT DOCUMENTS

| | | | |
|---|---|---|---|
| 5,680,536 | 10/1997 | Tyuluman | 710/102 |
| 5,793,987 | 8/1998 | Quackenbush et al. | 710/102 |
| 5,909,584 | 6/1999 | Tavallaei et al. | 710/102 |
| 5,918,023 | 6/1999 | Reeves et al. | 710/102 |
| 5,999,997 | 12/1999 | Pipes | 710/101 |

FOREIGN PATENT DOCUMENTS

| | | |
|---|---|---|
| 0288648 | 11/1988 | European Pat. Off. . |
| 0726528 | 8/1996 | European Pat. Off. . |

OTHER PUBLICATIONS

"Inside CompactPCI: PCI cards in a Eurocard format" Electronic Engineering, May 1996 (1996–05) pp. 81–82, 84–85 XP000598627 London GB.
Booklet entitled "CompactPCI Specification" by PCI Industrial Computers (Sep. 2, 1997).

*Primary Examiner*—Glenn A. Auve
*Attorney, Agent, or Firm*—S. Kevin Pickens

[57] ABSTRACT

A multiconfiguration backplane (100) can be configured in four different configurations: dual, extended, active/standby and active/active. The multiconfiguration backplane (100) has a first COMPACT PCI bus (110) with a first system processor slot (112), a first bridge slot (114), and a first set of one or more input/output slots (116). The multiconfiguration backplane has a second COMPACT PCI bus (120) with a second system processor slot (122), a second bridge slot (124), and a second set of one or more input/output slots (126). A first cross connection (130) is between the first system processor slot (112) and the second bridge slot (124), and a second cross connection (140) is provided between the second system processor slot (122) and the first bridge slot (114). Preferably, the first cross connection is a first local PCI bus and the second cross connection is a second local PCI bus.

11 Claims, 8 Drawing Sheets

MULTICONFIGURATION BACKPLANE

RELATED INVENTIONS

The present invention is related to the following inventions which are assigned to the same assignee as the present invention:

Method for switching between multiple system processors, filed May 14, 1998, having Ser. No. 09/079,091.

Method for switching between multiple system hosts, filed May 14, 1998, having Ser. No. 09/078,803.

Method and System for controlling a bus with multiple system hosts, filed May 14, 1998, having Ser. No. 09/079,130.

FIELD OF THE INVENTION

The present invention relates generally to bus architectures and, more specifically, to backplane configuration.

BACKGROUND OF THE INVENTION

A conventional computer system utilizes a bus for data transfer among the components of the system. A popular bus architecture is the PCI (Peripheral Component Interconnect) bus architecture, which includes numerous desirable features that are well known in the art. The PCI bus architecture is described, for example, in *PCI Local Bus Specification,* by the PCI Special Interest Group, 5300 N.E. Elam Young Parkway, Hillsborough, Oreg. The more recently developed COMPACTPCI® bus architecture is an implementation of PCI technology designed for industrial and/or embedded applications. The COMPACTPCI bus architecture is described in *COMPACTPCI Specification,* by PCI Industrial Computer Manufacturers Group (PCIMG®), 301 Edgewater Place Suite 220, Wakefield, Mass. COMPACTPCI and PCIMG are registered trademarks of the PCI Industrial Computer Manufacturers Group.

The COMPACTPCI standard places limitations on certain design aspects, such as the number of slots on the bus. Accordingly, it is advantageous to have a COMPACTPCI bus architecture based on multiple buses. Such a multiple bus architecture could have various configurations. However, providing a different backplane for each of these configurations is inefficient for the manufacturer and seller of the backplane and is expensive to a user who desires to upgrade a computer system to a different configuration. Accordingly, it would be desirable to have a backplane for a multiple COMPACTPCI bus architecture that is capable of multiple configurations.

DETAILED DESCRIPTION OF THE DRAWINGS

Figure 1:
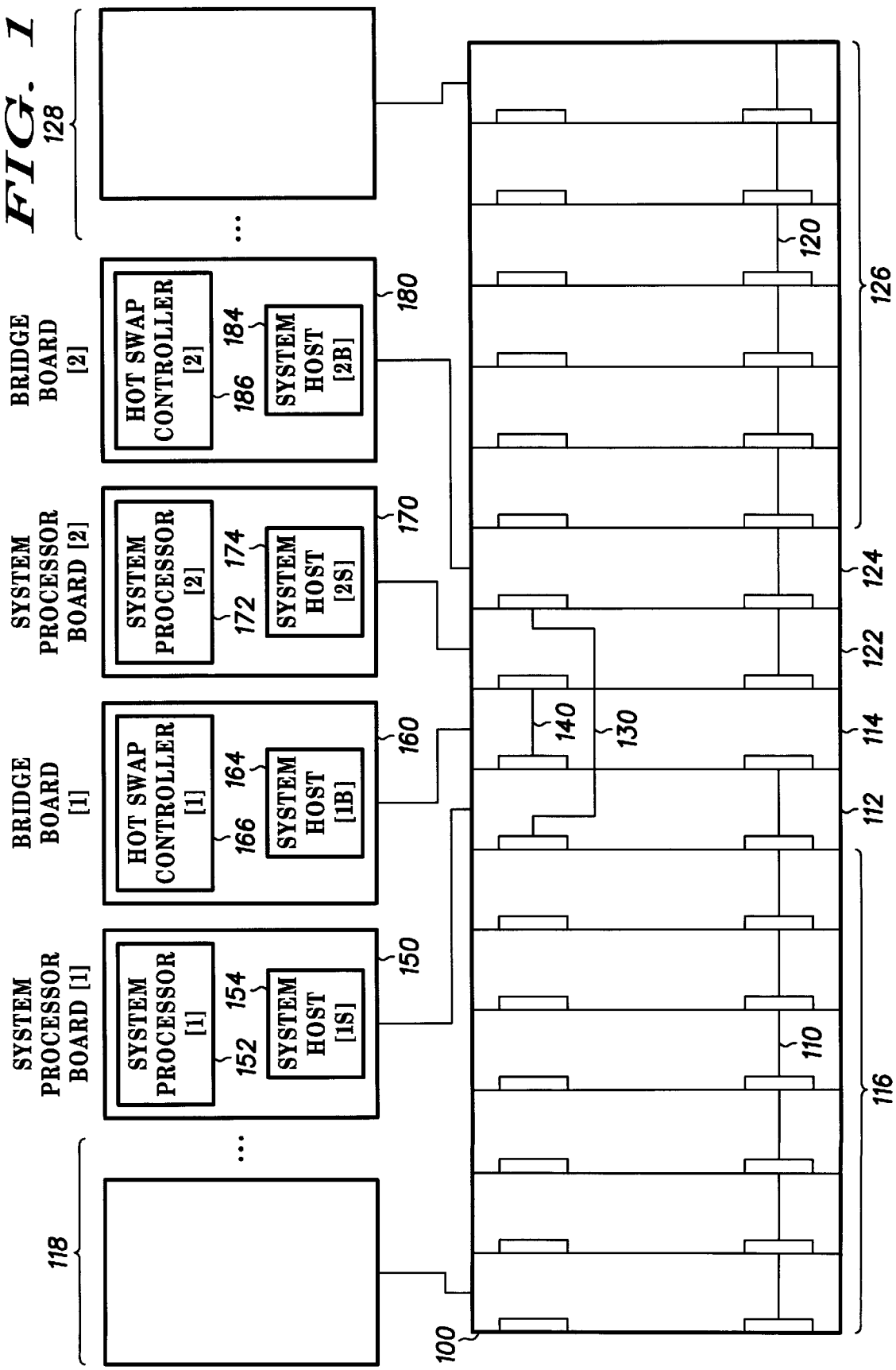
FIG. 1 is a circuit diagram of the multiconfiguration backplane of the preferred embodiment of the invention.

In a preferred embodiment of the invention, a multiconfiguration backplane is provided which can be configured in four different configurations: dual, extended, active/standby and active/active. The multiconfiguration backplane has a first COMPACTPCI® bus with a first system processor slot, a first bridge slot, and a first set of one or more input/output slots. The multiconfiguration backplane has a second COMPACTPCI bus with a second system processor slot, a second bridge slot, and a second set of one or more input/output slots. A first cross connection is provided between the first system processor slot and the second bridge slot, and a second cross connection is provided between the second system processor slot and the first bridge slot. Preferably, the first cross connection is a first local PCI bus and the second cross connection is a second local PCI bus.

In the dual configuration, the multiconfiguration backplane has a first system processor board inserted into the first system processor slot and a second system processor board inserted into the second system processor slot. Each of a first set of one or more input/output boards is inserted into one of the first set of one or more input/output slots, and each of a second set of one or more input/output boards is inserted into one of the second set of one or more input/output slots. The first system processor board has a first system processor controlling the first set of one or more input/output boards, and the second system processor board has a second system processor controlling the second set of one or more input/output boards.

In the extended configuration, the multiconfiguration backplane has a system processor board inserted into the first system processor slot and a bridge board inserted into the second bridge slot. Each of a first set of one or more input/output boards is inserted into one of the first set of one or more input/output slots, and each of a second set of one or more input/output boards is inserted into one of the second set of one or more input/output slots. The system processor board is coupled to the bridge board via the first cross connection. The system processor board has a system processor controlling the first set of one or more input/output boards on the first COMPACTPCI bus and controlling the second set of one or more input/output boards on the second COMPACTPCI bus.

In the active/standby configuration, the multiconfiguration backplane has a first system processor board inserted into the first system processor slot and a second system processor board inserted into the second system processor slot. Each of a first set of one or more input/output boards is inserted into one of the first set of one or more input/output slots, and each of a second set of one or more input/output boards is inserted into one of the second set of one or more input/output slots. A first bridge board is inserted into the first bridge slot and a second bridge board is inserted into the second bridge slot. In an active mode of the active/standby configuration, the first system processor board is coupled to the second bridge board via the first cross connection and has a first system processor controlling the first set of one or more input/output boards on the first COMPACTPCI bus and controlling the second set of one or more input/output boards on the second COMPACTPCI bus. In a standby mode of the active/standby configuration, the second system processor board is coupled to the first bridge board via the second cross connection and has a second system processor controlling the second set of one or more input/output boards on the second COMPACTPCI bus and controlling the first set of one or more input/output boards on the first COMPACTPCI bus.

In the active/active configuration, the multiconfiguration backplane has a first system processor board inserted into the first system processor slot and a second system processor board inserted into the second system processor slot. Each of a first set of one or more input/output boards is inserted into one of the first set of one or more input/output slots, and each of a second set of one or more input/output boards is inserted into one of the second set of one or more input/output slots. A first bridge board is inserted into the first bridge slot, and a second bridge board is inserted into the second bridge slot.

In a dual mode of the active/active configuration, the first system processor board has a first system processor controlling the first set of one or more input/output boards and the second system processor board has a second system processor controlling the second set of one or more input/output boards. In a first shared mode of the active/active configuration, the first system processor board is coupled to the second bridge board via the first cross connection and has a first system processor controlling the first set of one or more input/output boards on the first COMPACTPCI bus and controlling the second set of one or more input/output boards on the second COMPACTPCI bus. In a second shared mode of the active/active configuration, the second system processor board is coupled to the first bridge board via the second cross connection and having a second system processor controlling the second set of one or more input/output boards on the second COMPACTPCI bus and controlling the first set of one or more input/output boards on the first COMPACTPCI bus.

Multiconfiguration Backplane

FIG. 1 is a circuit diagram of the multiconfiguration backplane of the preferred embodiment of the invention. In FIG. 1, a backplane 100 has a COMPACTPCI Bus[1] 110 and a COMPACTPCI Bus[2] 120. Connected to COMPACTPCI Bus[1] 110 are a system processor slot[1] 112, a bridge slot[1] 114 and input/output slots[1] 116. The input/output slots[1] 116 provide for the insertion of input/output boards[1] 118 to implement corresponding devices. Connected to COMPACTPCI Bus[2] 120 are a system processor slot[2] 122, a bridge slot[2] 124 and input/output slots[2] 126. The input/output slots[2] provide for the insertion of input/output boards[2] 128 to implement corresponding devices. A cross connection[1] 130 couples system processor slot[1] 112 to bridge slot[2] 124. A cross connection[2] 140 couples system processor slot[2] 122 to bridge slot[1] 114. Preferably, the cross connection[1] 130 is a first local peripheral component interconnect (PCI) bus and the cross connection[2] 140 is a second local PCI bus.

Also shown in FIG. 1 are the system processor boards and bridge boards that connect to the backplane 100 to define the entire computer system. As noted above, the backplane 100 provides multiple potential configurations of the computer system. Depending on the selected configuration of the backplane 100, some combination of the system processor boards and bridge boards shown in FIG. 1 will be present and/or active. A system processor board[1] 150 having a system processor[1] 152 and a system host[1S] 154 is inserted into system processor slot[1] 112. A bridge board[1] 160 having a system host[1B] 164 and a hot swap controller[1] 166 is optionally inserted into the bridge slot[1] 114. A system processor board[2] 170 having a system processor[2] 172 and a system host[2S] 174 is inserted into system processor slot[2] 122. A bridge board[2] 180 having a system host[2B] 184 and a hot swap controller[2] 186 is optionally inserted into the bridge slot[2] 124. The system processor is, for example, the Motorola MPC750 processor system.

Figure 2:
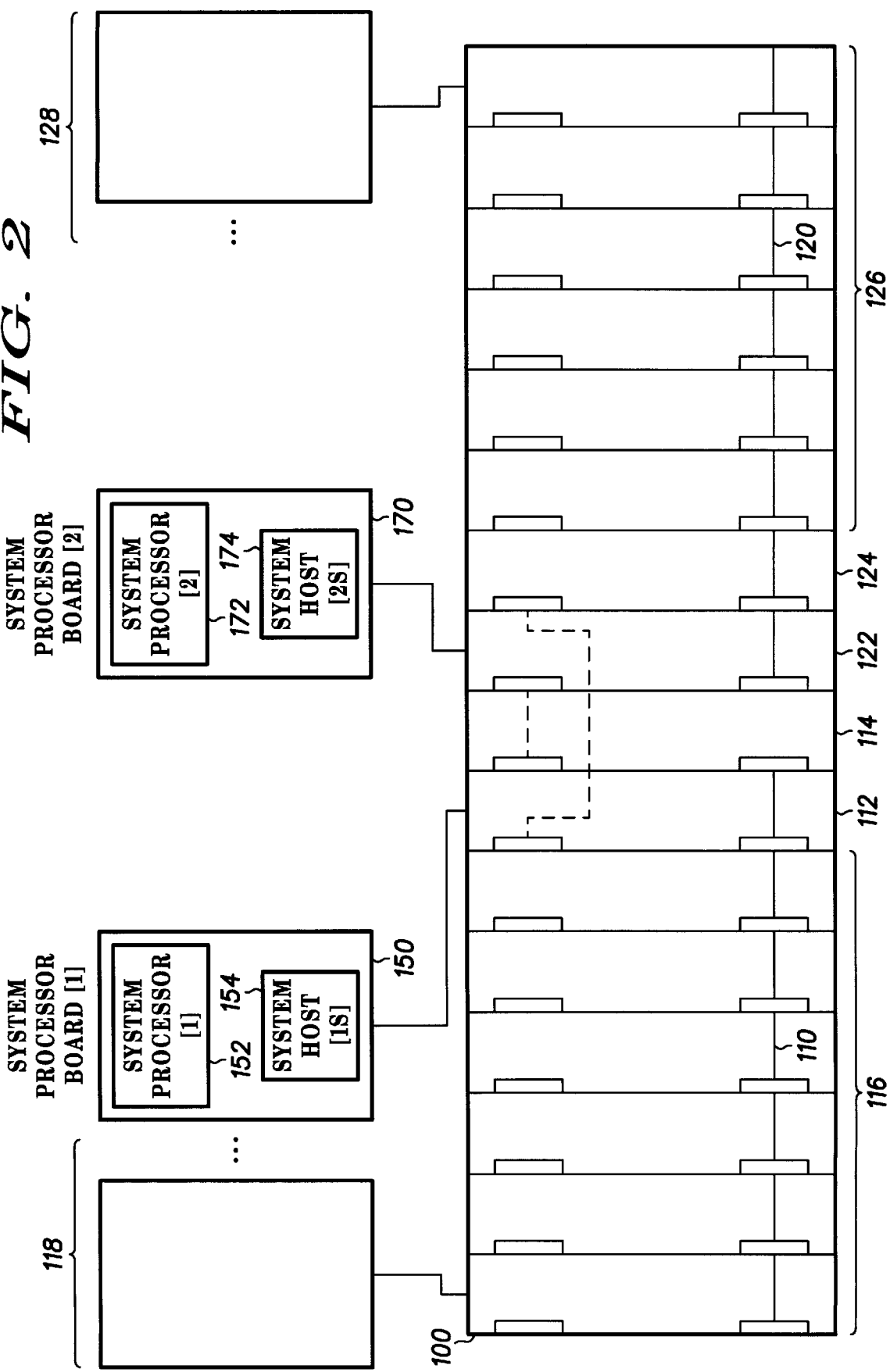
FIG. 2 is a circuit diagram of a dual configuration of the multiconfiguration backplane.

FIG. 2 is a circuit diagram of a dual configuration of the multiconfiguration backplane. In the dual configuration, a first and second subsystem function independently of each other. In FIG. 2, the system processor board[1] 150 is inserted into system processor slot[1] 112 and the system processor board[2] 170 is inserted into the system processor slot[2] 122. The system processor[1] 152 controls the input/output boards[1] 118 on COMPACTPCI Bus[1] 110 to control the devices implemented therewith in a first subsystem. The system host[1S] 154 controls the COMPACTPCI Bus[1] 110 bus functions. The system processor[2] 172 controls the input/output boards[2] 128 on COMPACTPCI Bus[2] 120 to control the devices implemented therewith in a second subsystem. The system host[2S] 174 controls the COMPACTPCI Bus[2] 120 bus functions. Neither cross connection[1] 130 nor cross connection[2] 140 are used.

Figure 3:
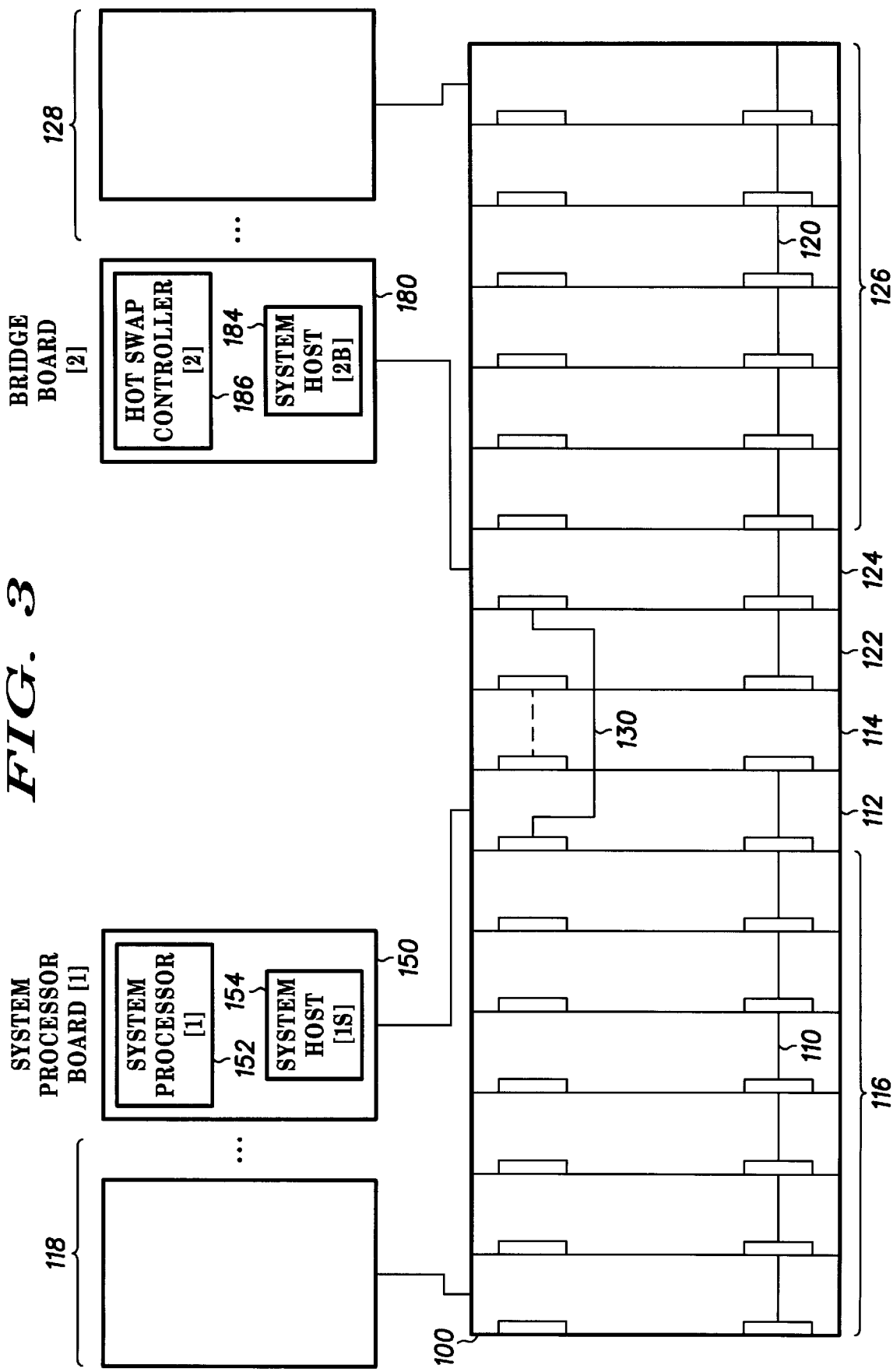
FIG. 3 is a circuit diagram of an extended configuration of the multiconfiguration backplane.

FIG. 3 is a circuit diagram of an extended configuration of the multiconfiguration backplane. In the extended configuration, a single system processor controls the devices implemented on both buses. In FIG. 3, the system processor board[1] 150 is inserted into system processor slot[1] 112 and the bridge board[2] 180 is inserted into the bridge slot[2] 124. The system processor[1] 152 controls the input/output boards[1] 118 on COMPACTPCI Bus[1] 110 to control the devices implemented therewith. The system host[1S] 154 controls the COMPACTPCI Bus[1] 110 bus functions. The system processor[1] 152 also controls the input/output boards[2] 128 on COMPACTPCI Bus[2] 120 via the cross connection[1] 130 to control the devices implemented therewith. The system host[2B] 184 controls the COMPACTPCI Bus[2] 120 bus functions. The cross connection[2] 140 is not used.

Figure 4:
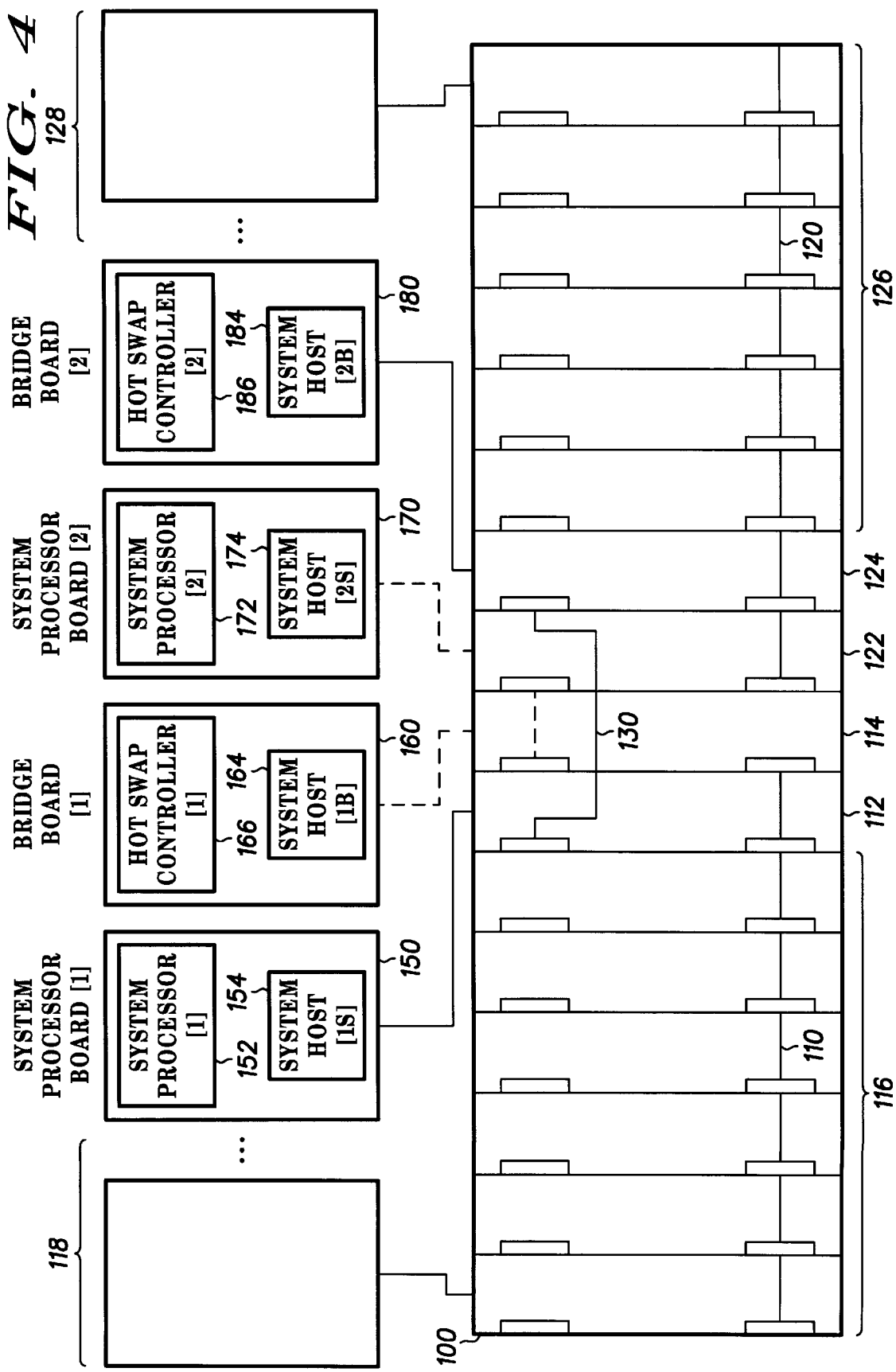
FIG. 4 is a circuit diagram of an active/standby configuration of the multiconfiguration backplane in an active mode.

FIG. 4 is a circuit diagram of an active/standby configuration of the multiconfiguration backplane in an active mode. In the active/standby system, a single active system processor controls the devices implemented on both buses in an active mode. If there is a failure in the active system processor, a standby processor takes over control of the devices in a standby mode. In FIG. 4, the system processor board[1] 150 is inserted into system processor slot[1] 112 and the system processor board[2] 170 is inserted into the system processor slot[2] 122. The bridge board[1] 160 is inserted into the bridge slot[1] 114 and the bridge board[2] 180 is inserted into the bridge slot[2] 124. In an active mode, the system processor board[1] 150 and bridge board[2] 180 are used as companion boards. The system processor[1] 152 controls the input/output boards[1] 118 on COMPACTPCI Bus[1] 110 and also controls the input/output boards[2] 128 on COMPACTPCI Bus[2] 120 via the cross connection[1] 130. The system host[1S] 154 controls the COMPACTPCI Bus[1] 110 bus functions and the system host[2B] 184 controls the COMPACTPCI Bus[2] 120 bus functions. The cross connection[2] 140 is not used.

Figure 5:
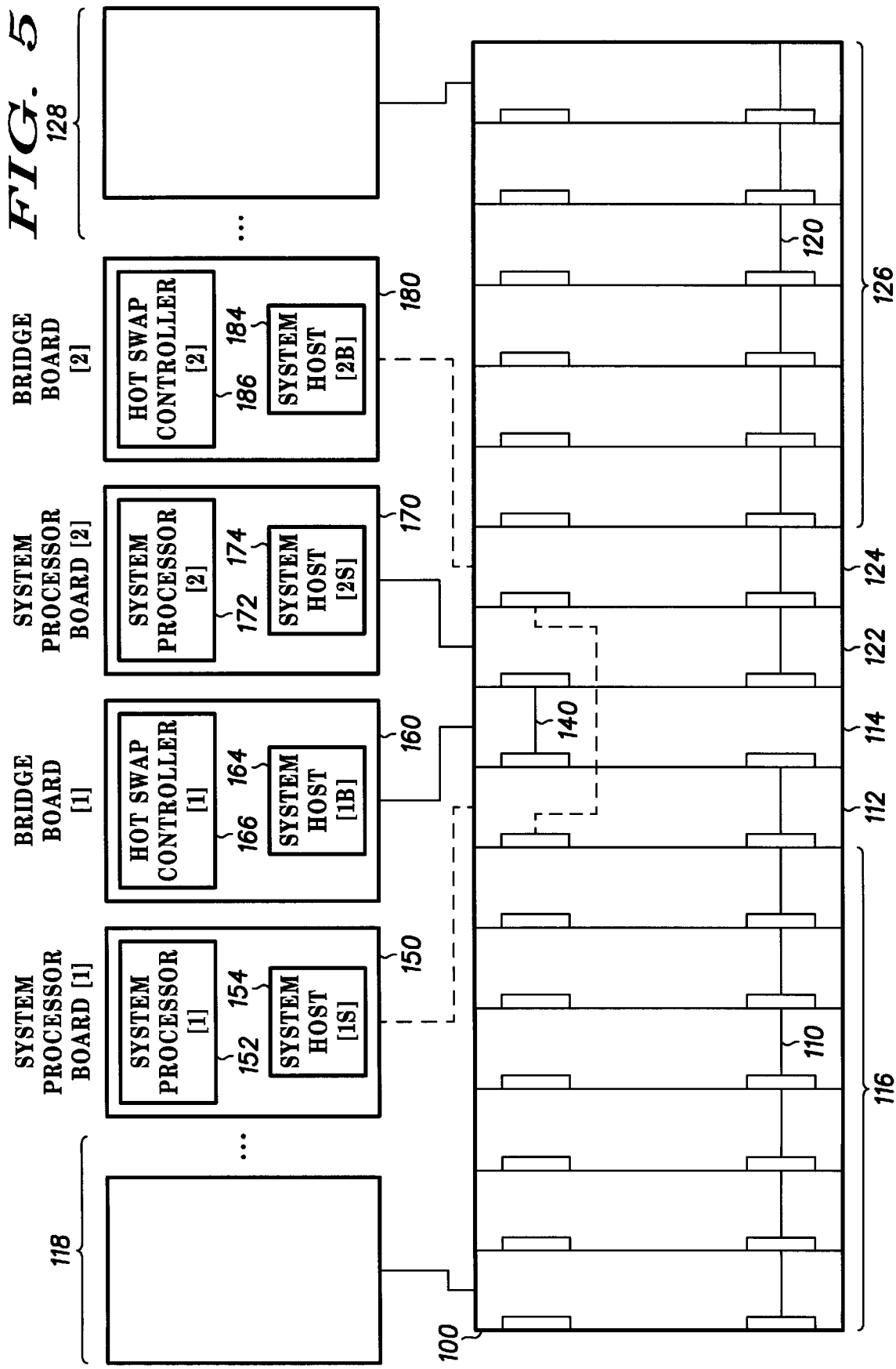
FIG. 5 is a circuit diagram of an active/standby configuration of the multiconfiguration backplane in a standby mode.

FIG. 5 is a circuit diagram of the active/standby configuration of the multiconfiguration backplane in a standby mode. In the standby mode, system processor board[2] 170 and bridge board[1] 160 are used as companion boards. The system processor[2] 172 controls the input/output boards[2] 128 on COMPACTPCI Bus[1] 110 and also controls the input/output boards[1] 118 on COMPACTPCI Bus[2] 120 via the cross connection[2] 140. The system host[1B] 164 controls the COMPACTPCI Bus[1] 110 bus functions and the system host[2S] 174 controls the COMPACTPCI Bus[2] 120 bus functions The cross connection[1] 130 is not used.

In an active/active configuration, both system processor boards and both bridge boards are inserted, as shown in FIG. 1. The system processor board[1] 150 is inserted into system processor slot[1] 112 and the system processor board[2] 170 is inserted into the system processor slot[2] 122. The bridge board[1] 160 is inserted into bridge slot[1] 114 and the bridge board[2] 180 is inserted into bridge slot[2] 124. In a dual mode, a first and second system function independently of each other, as in the dual configuration described above. The system processor[1] 152 controls the input/output boards[1] 118 on COMPACTPCI Bus[1] 110 to control the devices implemented therewith in a first system. The system processor[2] 172 controls the input/output boards[2] 128 on COMPACTPCI Bus[2] 120 to control the devices implemented therewith in a second system. The system host[1S] 154 controls the COMPACTPCI Bus[1] 110 bus functions and the system host[2S] 174 controls the COMPACTPCI Bus[2] 120 bus functions. Neither cross connection[1] 130 nor cross connection[2] 140 are used.

In the active/active configuration, if there is a failure in the system processor on COMPACTPCI Bus[2] 120, the processing load is shifted to system processor[1] 152 in a first shared mode. The first shared mode operates identically to the active mode of the active/standby configuration discussed above and shown in FIG. 4. If there is a failure in the system processor on COMPACTPCI Bus[1] 110, the processing load is shifted to system processor[2] 172 in a second shared mode. The second shared mode operates identically to the standby mode of the active/standby configuration discussed above and shown in FIG. 5.

Host Board Swap

As shown above, multiple system hosts are provided on each bus. The system processor board[1] 150, bridge board[1] 160, system processor board[2] 170 and bridge board[2] 180 are each a "host board" on which a system host resides. As a result, control of the bus functions on either bus can be switched over from an active system host to a standby system host in the event of a failure on the active host board. Conventional COMPACTPCI bus architecture allows for a non-host board on a COMPACTPCI bus, such as one of the input/output boards 118 or one of the input/output boards 128, to be "hot swapped". That is, the board can be removed and replaced without interrupting the operation of the computer system by resetting the devices. This is described, for example, in *COMPACTPCI Hot Swap Specification,* by PCI Industrial Computer Manufacturers Group, 301 Edgewater Place Suite 220, Wakefield, Mass. Accordingly, by providing multiple system hosts on each COMPACTPCI bus, the preferred embodiment of the invention provides the capability of hot swapping the host board, allowing a failed host board to be replaced while operations continue. As a result, the advantages of the COMPACTPCI bus architecture can be provided to a highly available or fault tolerant application.

Figure 6:
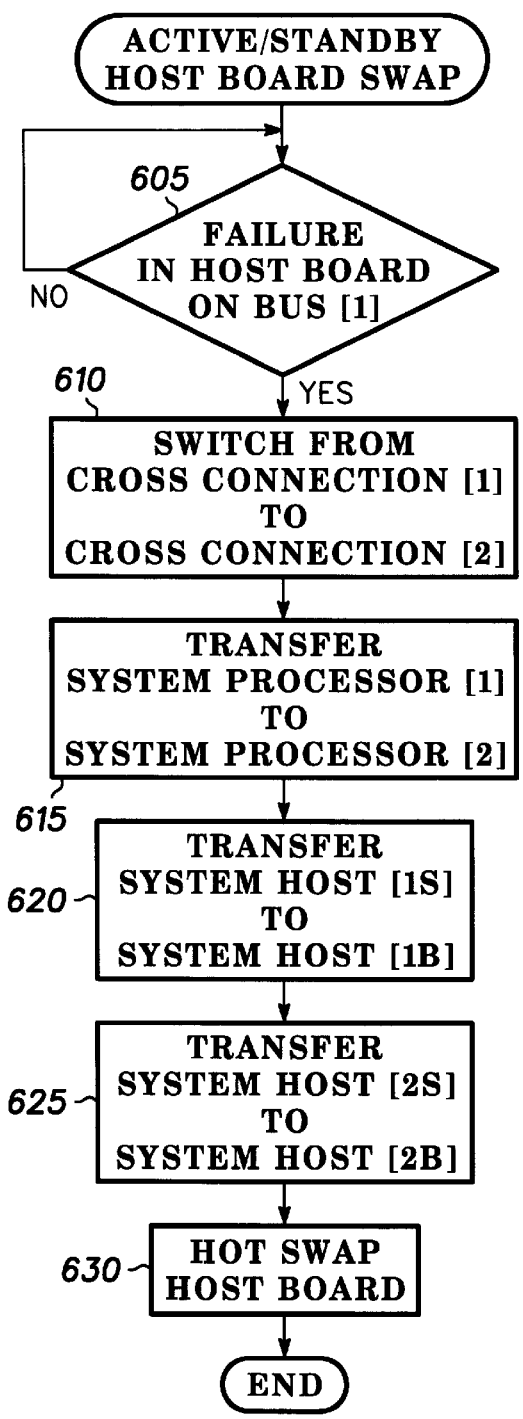
FIG. 6 is a flowchart of the process of swapping the host board in an active/standby configuration.

FIG. 6 is a flowchart of the process performed by the computer system of the preferred embodiment for swapping the host board in an active/standby configuration. The basic functions described in FIG. 6 are performed by a combination of the system processor 152 or 172, the system host 154, 164, 174 or 184 and the hot swap controller 166 or 186, and are further elaborated later in the specification. One of ordinary skill in the art will recognize how to implement these functions in manner best suited for the application at hand, however, based on the description herein. In step 605, if a failure is detected in the host board, control proceeds to step 610. In step 610, cross connection[2] 140 is utilized instead of cross connection[1] 130. In step 615, system processing is transferred from system processor[1] 152 to system processor[2] 172. Step 615 will be explained later in greater detail. In step 620, control of the COMPACTPCI Bus[1] 110 bus functions is transferred from system host[1S] 154 to system host[1B] 164. In step 625, control of the COMPACTPCI Bus[2] 120 bus functions is transferred from system host[2B] 184 to system host [2S] 174. System host transfer will be explained later in greater detail with reference to FIG. 8 and FIG. 9. In step 630, the failed host board is hot swapped and the host board failure is corrected without interrupting operation of the system.

Figure 7:
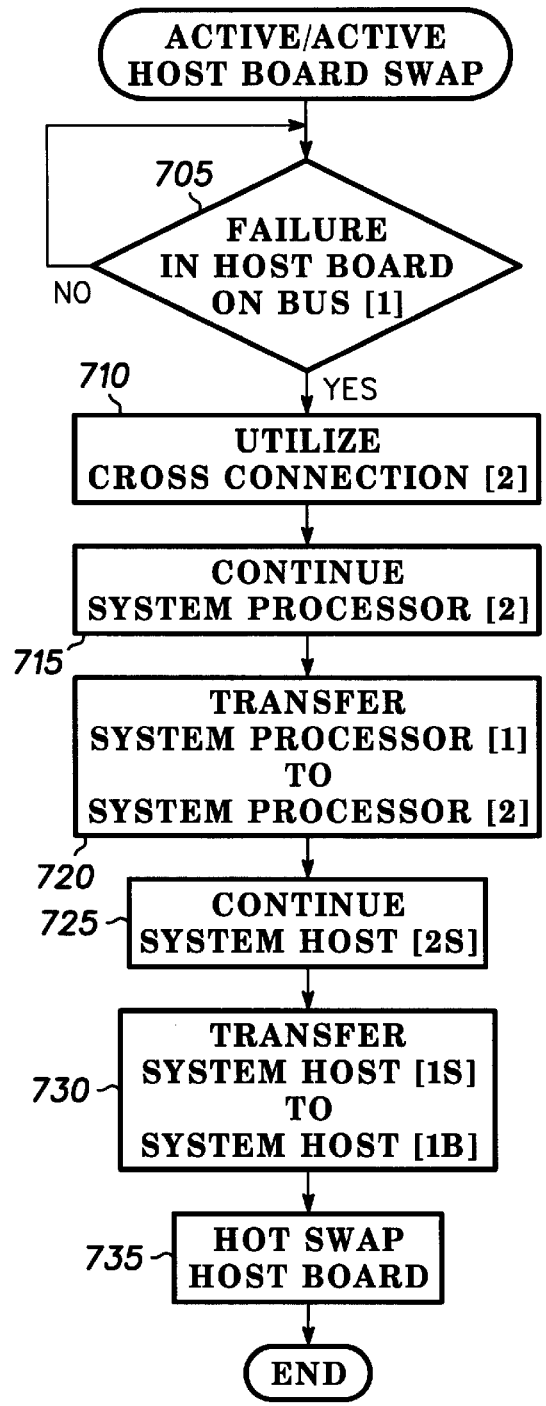
FIG. 7 is a flowchart of the process of swapping the host board in an active/active configuration.

FIG. 7 is a flowchart of the process of swapping the host board in an active/active configuration. As in FIG. 6, the basic functions described in FIG. 7 are performed by a combination of the system processor 152 or 172, the system host 154, 164, 174 or 184 and the hot swap controller 166 or 186, and are further elaborated later in the specification. One of ordinary skill in the art will recognize how to implement these functions in manner best suited for the application at hand, however, based on the description herein. In step 705, if a failure is detected in the host board, control proceeds to step 710. In step 710, cross connection [2] 140 is utilized. The system processor[2] 172 continues to control processing on COMPACTPCI Bus[2] 120 as noted in step 715. In step 720, processing control of the devices on COMPACTPCI Bus[1] 110 is transferred to system processor[2] 172. System processor transfer will be explained later in greater detail with reference to FIG. 10. The system host[2S] 174 continues to control COMPACTPCI Bus[2] 120 bus functions, as noted in step 725. Control of the COMPACTPCI Bus[1] 110 bus functions is transferred from system host[1S] 154 to system host[1B] 164 in step 730. In step 735, the failed host board is hot swapped and the host board failure is corrected without interrupting operation of the system.

As noted above, the conventional COMPACTPCI standard provides hot swap capability. As such, the hot swap controller[1] 166 on bridge board[1] 160 and hot swap controller[2] 186 on bridge board[2] 180 are based on conventional COMPACTPCI hot swap as defined in the *COMPACTPCI Hot Swap Specification,* cited above. One of ordinary skill in the art will readily implement the hot swap controllers based on the description herein, based on the *COMPACTPCI Hot Swap Specification,* and based on design preference and suitability to the application at hand. Hot swapping the host board, however, requires some modifications to the conventional COMPACTPCI system host to ensure that bus control functions are not corrupted by the existence of two system hosts on a bus.

Figure 8:
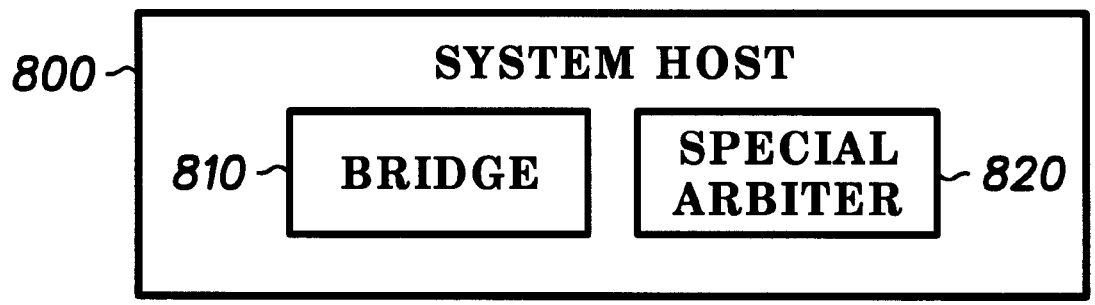
FIG. 8 is a circuit diagram of the system host.

FIG. 8 is a circuit diagram of a system host with such modifications. The system host 800 in FIG. 8 corresponds to system host[1S] 154, system host[1B] 164, system host[2S] 174 or system host[2B] 184. The system host 800 includes a conventional PCI-to-PCI bridge 810 which connects the COMPACTPCI bus to a local PCI bus on the host board. The bridge 810 is, for example, a DEC 21154 PCI Bridge Arbiter. The system host 800 further includes a special arbiter 820. The special arbiter 820 replaces the function of the conventional bus arbiter included in the bridge 810, which is disabled. The special arbiter 820 is the same as the conventional PCI bus arbiter, except that several additional features are provided which allow for system host switchover. These features are explained with reference to FIG. 9 below.

Figure 9:
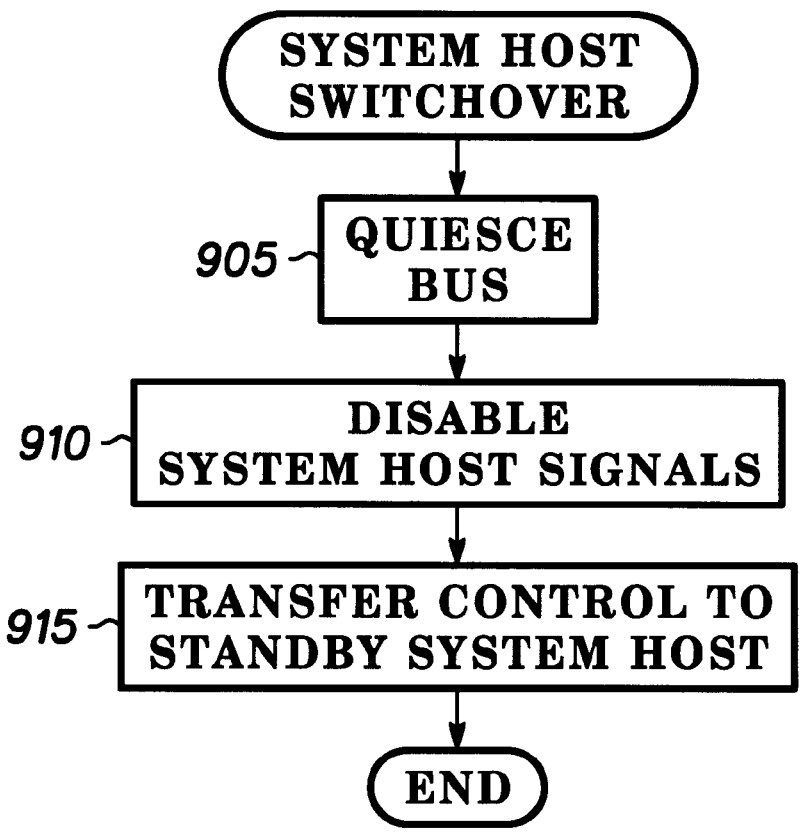
FIG. 9 is a flowchart of the process of switching over the system host.

FIG. 9 is a flowchart of the process of switching over the system host. The process is performed by the hot swap controller 166 and the special arbiter 820 in system host[1S] 154 or system host[1B] 164 to switch between system host[1S] 154 and system host[1B] 164 on COMPACTPCI Bus[1] 110, or performed by the hot swap controller 186 and the special arbiter 820 in system host[2S] 174 or system host[2B] 184 to switch between system host[2S] 174 and system host[2B] 184 on COMPACTPCI Bus[2] 120, as in the various scenarios described above. In step 905, the hot swap controller quiesces the bus. More specifically, the hot swap controller provides to the special arbiter 820 a high priority request signal which the special arbiter 820 grants only when the bus is idle. A special pair of Request/Grant lines are provided in the special arbiter 820 for the hot swap controller to use for this purpose.

In step 910, the computer system disables system host signals provided by the active system host. Specifically, the hot swap controller provides to the special arbiter 820 a float signal causing the special arbiter 820 to disable the system host signals it provides when active. A special float line is added to the special arbiter 820 for the hot swap controller to use for this purpose. The system host signals that are disabled by the float signal include grant signals for granting bus access to devices on the bus, reset signals for resetting devices on the bus, and clock signals and interrupts that are provided to the devices on the bus. The special arbiter 820 defines its grant signals, reset signals and clock signals to be three-state signals wherein a high impedance state is added as a third state. The float signal causes the special arbiter 820 to place the three-state grant signals, reset signals and clock signals in the third state and to disable the interrupts. In step 915, the hot swap controller transfers control from the failed active system host to the standby system host. Although described in the order shown for simplicity of description, the preferred embodiment of the invention transfers the reset signals and clock signals to the standby system host before they are disabled by the active system host so that the reset and clock signals are not allowed to got to an indeterminate state in which an undesired signal could be sent to any of the devices. Also, the clock signals preferably are placed in the third state on the terminating edge to prevent short cycles.

System Processor Board Swap

Swapping of the system processor board requires switching over control of the system processor. For example, control is transferred from system processor[1] 152 to system processor[2] 172 in the case of a failure affecting system processor board[1] 150, or from system processor[2] 172 to system processor[1] 152 in the case of a failure affecting system processor board[2] 170. Highly available or fault tolerant applications require that system processor switchover be accomplished without resetting the devices on the system or otherwise interrupting operation of the system. However, since system processor[1] 152 and system processor[2] 172 operate independently, such a switchover endangers the system. For example, a device on the COMPACTPCI bus may be performing a direct memory access to the active system processor's memory during switchover. The standby system processor might not utilize the same addressing scheme, however, such that critical data would be corrupted when the device writes to the originally intended address. The preferred embodiment of the invention provides a seamless switchover of system processor control by the standby system processor to prevent such a corruption.

Figure 10:
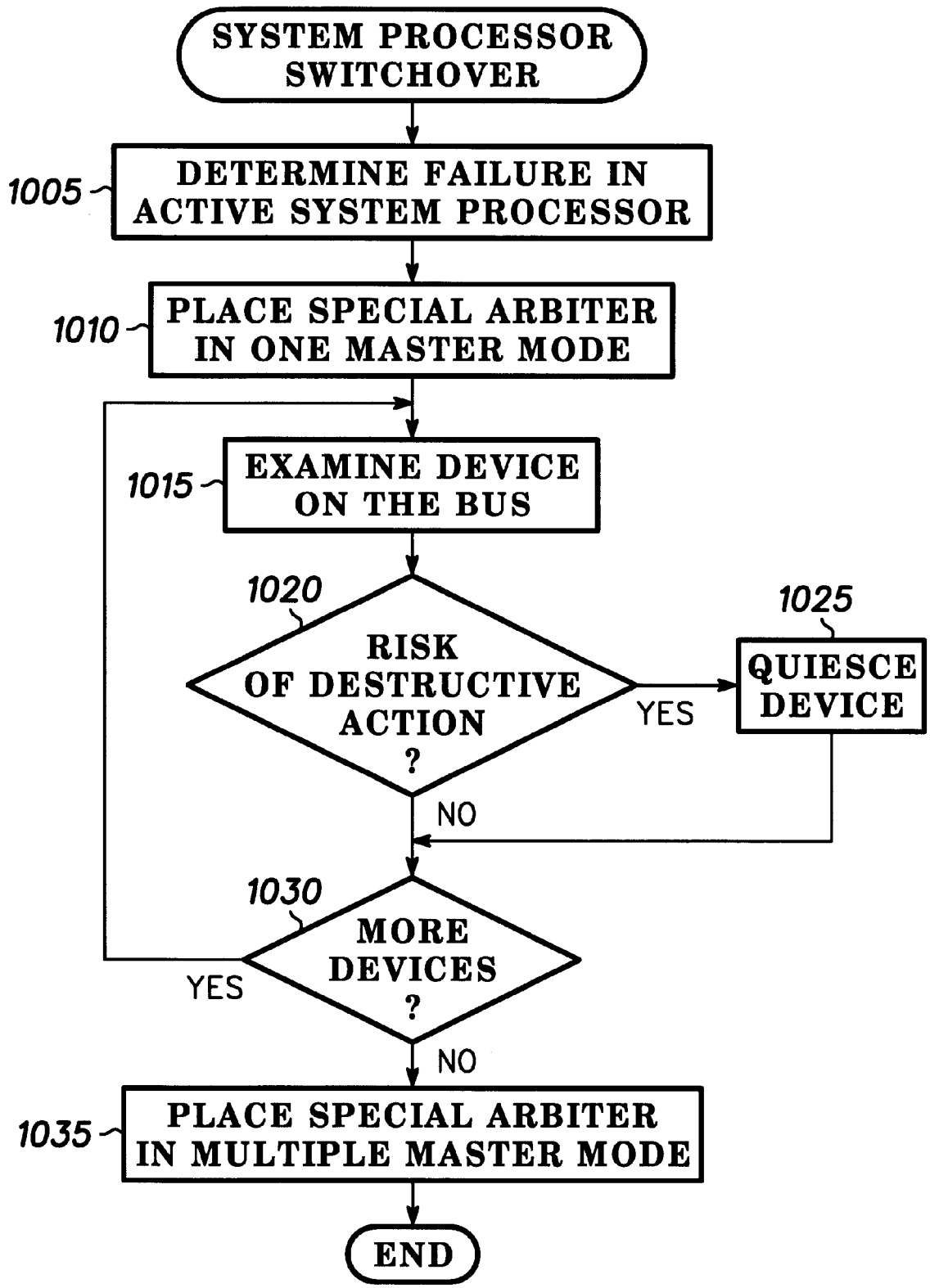
FIG. 10 is a flowchart of the process of switching over the system processor.

FIG. 10 is a flowchart of the seamless switchover of the system processor. The functions of FIG. 10 are performed by the standby system processor to switch from the active system processor to the standby system processor. In step 1005, the standby system processor determines whether there is a failure affecting the active system processor, such as a failure on the active system processor board or on a companion bridge board requiring switchover of the active system processor to the standby system processor, as was described above. In step 1010, the standby system processor places the special arbiter 800 into a one master mode, so that it will not provide a bus grant to any device other than the standby system processor. In step 1015, the standby system processor examines a device on the bus and determines in step 1020 whether the device is at risk of performing a destructive action. For example, the standby system processor accesses status information on the device and determines whether interrupts to the device are enabled, determines whether the device has the capability of performing a direct memory access to the active system processor, and/or determines whether the device is on a failed board, such as a failure on the active system processor board or companion board.

In step 1025, if the standby system processor determines in step 1020 that the device is at risk of performing a destructive action, then the standby system processor quiesces the device. For example, the standby system processor programs the device to cease operation or changes an address to which the device is writing. As long as there are more devices to examine in step 1030, the standby system processor repeats steps 1015 through 1030. Finally, in step 1035, all devices at risk of performing a destructive action having been quiesced, and the standby system processor places the special arbiter 800 into a multiple master mode that will allow it to provide bus grants to devices other than the standby system processor.

It should be appreciated that the invention described herein provides the advantages of a single backplane with multiple configurations. The present invention has been described above with reference to preferred embodiments. However, those skilled in the art will recognize that changes and modifications may be made in these preferred embodiments without departing from the scope of the present invention.

What is claimed is:

1. A multiconfiguration backplane, comprising:
   a first COMPACTPCI bus having a first system processor slot, a first bridge slot, and a first set of one or more input/output slots;
   a second COMPACTPCI bus having a second system processor slot, a second bridge slot, and a second set of one or more input/output slots;
   a first cross connection between the first system processor slot and the second bridge slot; and
   a second cross connection between the second system processor slot and the first bridge slot.

2. The multiconfiguration backplane of claim 1, further comprising:
   a first system processor board inserted into the first system processor slot;
   a second system processor board inserted into the second system processor slot;
   a first set of one or more input/output boards, each inserted into one of the first set of one or more input/output slots;
   a second set of one or more input/output boards, each inserted into one of the second set of one or more input/output slots;
   the first system processor board having a first system processor controlling the first set of one or more input/output boards; and the second system processor board having a second system processor controlling the second set of one or more input/output boards.

3. The multiconfiguration backplane of claim 1, further comprising:

a system processor board inserted into the first system processor slot;

a bridge board inserted into the second bridge slot;

a first set of one or more input/output boards, each inserted into one of the first set of one or more input/output slots;

a second set of one or more input/output boards, each inserted into one of the second set of one or more input/output slots; and the system processor board being coupled to the bridge board via the first cross connection and having a system processor controlling the first set of one or more input/output boards on the first COMPACTPCI bus and controlling the second set of one or more input/output boards on the second COMPACTPCI bus.

4. The multiconfiguration backplane of claim 1, further comprising:

a first system processor board inserted into the first system processor slot;

a second system processor board inserted into the second system processor slot;

a first set of one or more input/output boards, each inserted into one of the first set of one or more input/output slots;

a second set of one or more input/output boards, each inserted into one of the second set of one or more input/output slots;

a first bridge board inserted into the first bridge slot;

a second bridge board inserted into the second bridge slot;

the first system processor board being coupled to the second bridge board via the first cross connection and having a first system processor controlling the first set of one or more input/output boards on the first COMPACTPCI bus and controlling the second set of one or more input/output boards on the second COMPACTPCI bus in an active mode; and the second system processor board being coupled to the first bridge board via the second cross connection and having a second system processor controlling the second set of one or more input/output boards on the second COMPACTPCI bus and controlling the first set of one or more input/output boards on the first COMPACTPCI bus in a standby mode.

5. The multiconfiguration backplane of claim 1, further comprising:

a first system processor board inserted into the first system processor slot;

a second system processor board inserted into the second system processor slot;

a first set of one or more input/output boards, each inserted into one of the first set of one or more input/output slots;

a second set of one or more input/output boards, each inserted into one of the second set of one or more input/output slots;

a first bridge board inserted into the first bridge slot;

a second bridge board inserted into the second bridge slot;

the first system processor board having a first system processor controlling the first set of one or more input/output boards and the second system processor board having a second system processor controlling the second set of one or more input/output boards in a dual mode;

the first system processor board being coupled to the second bridge board via the first cross connection and having a first system processor controlling the first set of one or more input/output boards on the first COMPACTPCI bus and controlling the second set of one or more input/output boards on the second COMPACTPCI bus in a first shared mode; and the second system processor board being coupled to the first bridge board via the second cross connection and having a second system processor controlling the second set of one or more input/output boards on the second COMPACTPCI bus and controlling the first set of one or more input/output boards on the first COMPACTPCI bus in a second shared mode.

6. The multiconfiguration backplane of claim 1, wherein the first cross connection is a first local peripheral component interconnect bus and the second cross connection is a second local peripheral component interconnect bus.

7. A multiconfiguration backplane, comprising:

a first bus having a first system processor slot, a first bridge slot, and a first set of one or more input/output slots;

a second bus having a second system processor slot, a second bridge slot, and a second set of one or more input/output slots;

a first cross connection between the first system processor slot and the second bridge slot; and a second cross connection between the second system processor slot and the first bridge slot.

8. The multiconfiguration backplane of claim 7, further comprising:

a first system processor board inserted into the first system processor slot;

a second system processor board inserted into the second system processor slot;

a first set of one or more input/output boards, each inserted into one of the first set of one or more input/output slots;

a second set of one or more input/output boards, each inserted into one of the second set of one or more input/output slots;

the first system processor board having a first system processor controlling the first set of one or more input/output boards; and the second system processor board having a second system processor controlling the second set of one or more input/output boards.

9. The multiconfiguration backplane of claim 7, further comprising:

a system processor board inserted into the first system processor slot;

a bridge board inserted into the second bridge slot;

a first set of one or more input/output boards, each inserted into one of the first set of one or more input/output slots;

a second set of one or more input/output boards, each inserted into one of the second set of one or more input/output slots; and the system processor board being coupled to the bridge board via the first cross connection and having a system processor controlling the first set of one or more input/output boards on the first bus and controlling the second set of one or more input/output boards on the second bus.

10. The multiconfiguration backplane of claim 7, further comprising:

a first system processor board inserted into the first system processor slot;

a second system processor board inserted into the second system processor slot;

a first set of one or more input/output boards, each inserted into one of the first set of one or more input/output slots;

a second set of one or more input/output boards, each inserted into one of the second set of one or more input/output slots;

a first bridge board inserted into the first bridge slot;

a second bridge board inserted into the second bridge slot;

the first system processor board being coupled to the second bridge board via the first cross connection and having a first system processor controlling the first set of one or more input/output boards on the first bus and controlling the second set of one or more input/output boards on the second bus in an active mode; and the second system processor board being coupled to the first bridge board via the second cross connection and having a second system processor controlling the second set of one or more input/output boards on the second bus and controlling the first set of one or more input/output boards on the first bus in a standby mode.

11. The multiconfiguration backplane of claim 7, further comprising:

a first system processor board inserted into the first system processor slot;

a second system processor board inserted into the second system processor slot;

a first set of one or more input/output boards, each inserted into one of the first set of one or more input/output slots;

a second set of one or more input/output boards, each inserted into one of the second set of one or more input/output slots;

a first bridge board inserted into the first bridge slot;

a second bridge board inserted into the second bridge slot;

the first system processor board having a first system processor controlling the first set of one or more input/output boards and the second system processor board having a second system processor controlling the second set of one or more input/output boards in a dual mode;

the first system processor board having a first system processor controlling the first set of one or more input/output boards and the second system processor board having a second system processor controlling the second set of one or more input/output boards in a dual mode;

the first system processor board being coupled to the second bridge board via the first cross connection and having a first system processor controlling the first set of one or more input/output boards on the first bus and controlling the second set of one or more input/output boards on the second bus in a first shared mode; and the second system processor board being coupled to the first bridge board via the second cross connection and having a second system processor controlling the second set of one or more input/output boards on the second bus and controlling the first set of one or more input/output boards on the first bus in a second shared mode.

* * * * *